US012671523B2

(12) United States Patent
Niu et al.

(10) Patent No.: US 12,671,523 B2
(45) Date of Patent: Jun. 30, 2026

(54) DATA RETRANSMISSION METHOD AND ACCESS POINT DEVICE

(71) Applicant: GUANGDONG OPPO MOBILE TELECOMMUNICATIONS CORP., LTD., Dongguan (CN)

(72) Inventors: Xuan Niu, Dongguan (CN); Ronghui Hou, Dongguan (CN); Zuomin Wu, Dongguan (CN); Cong Shi, Dongguan (CN); Jun Zhang, Dongguan (CN); Chaoming Luo, Dongguan (CN); Ning Yang, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 578 days.

(21) Appl. No.: 18/121,335

(22) Filed: Mar. 14, 2023

(65) Prior Publication Data

US 2023/0216608 A1     Jul. 6, 2023

Related U.S. Application Data

(63) Continuation of application No. PCT/CN2020/115384, filed on Sep. 15, 2020.

(51) Int. Cl.
H04L 1/08          (2006.01)
H04W 8/30          (2009.01)

(52) U.S. Cl.
CPC ................ H04L 1/08 (2013.01); H04W 8/30 (2013.01)

(58) Field of Classification Search
None
See application file for complete search history.

(56) References Cited

U.S. PATENT DOCUMENTS

2006/0221993 A1* 10/2006 Liao ...................... H04W 74/06
                                                       370/328
2016/0014034 A1*  1/2016 Bhushan ........... H04W 74/0816
                                                       370/253

(Continued)

FOREIGN PATENT DOCUMENTS

CN          102474395 A       5/2012
CN          103873216 A       6/2014

(Continued)

OTHER PUBLICATIONS

Extended European Search Report dated Apr. 24, 2024 received in European Patent Application No. EP20953546.7.

(Continued)

*Primary Examiner* — The Hy Nguyen
(74) *Attorney, Agent, or Firm* — Sheppard, Mullin, Richter & Hampton LLP

(57)          ABSTRACT

The embodiments of the present disclosure provide a data retransmission method and an access point device, capable of achieving downlink data retransmission in a multi-AP cooperation scenario, which can reduce the number of downlink data retransmissions and transmission delay, thereby improving user experience. The data retransmission method includes: transmitting, by a first access point device, first request information when the first access point device fails to transmit a first data frame to a station device, the first request information requesting a second access point device to retransmit the first data frame, and the first access point device and the second access point device belonging to one operation set.

11 Claims, 9 Drawing Sheets

200

(56) References Cited

U.S. PATENT DOCUMENTS

| | | | | |
|---|---|---|---|---|
| 2016/0338066 A1* | 11/2016 | Yang | .................... | H04W 72/21 |
| 2017/0126364 A1 | 5/2017 | Kim et al. | | |
| 2021/0351869 A1* | 11/2021 | Dash | .................... | H04L 1/0027 |
| 2022/0353018 A1* | 11/2022 | Sugaya | .................... | H04L 1/18 |
| 2025/0141833 A1* | 5/2025 | Baron | ................ | H04L 61/2596 |

FOREIGN PATENT DOCUMENTS

| | | |
|---|---|---|
| CN | 107040356 A | 8/2017 |
| CN | 109672492 A | 4/2019 |
| CN | 106850125 B | 11/2019 |
| CN | 110572244 A | 12/2019 |

OTHER PUBLICATIONS

Zte et al:"Centralized retransmission of lost PDUs" 3GPP DRAFT;R3-172936 Centralized Retransmission of Lost Pdus 3rd Ceneration Partnership Project (3GPP), Mobile Competence CENTRE;650, Route Des Lucioles;F-06921 Sophia-Antipolis Cedex;France,vol. RAN WG3 no.Berlin Germany;Aug. 21, 2017-Aug. 252, 2017,Aug. 1, 2017(Aug. 21, 2017) XP051319776.

Nokia et al:"Retransmission procedure in radio link outage"3GPP Draft;R3-173554 Retransmission Radio Link OUTAGE_TP38.401 3rd Generation Partnership PROECT(3GPP),MOBILE Competence Centre;650 Route Des Lucioles ;F-06921 Sophia-Antipolis Cedex; Fra, vol. RAN WG3,no.Prague, Czech Republic;Oct. 9, 2017-Oct. 13, 2017,Oct. 9, 2017(Oct. 9, 2017) XP051343980.

Samsung:"Discussion on latency reduction in IAB"3GPP Draft;R3-205417 3rd Generation Partnership Project(3GPP),Mobile Compe-tence Centre;650 Route Des Lucioles;F-06921 Sophia-Antipolis Cedex;France,vol. RAN WG3 no.online; 2020081720200828 , Aug. 7, 2020(Aug. 7, 2020) XP052398481.

International Search Report and Written Opinion dated May 26, 2021 in International Application No. PCT/CN2020/115384. Eng-lish translation attached.

LG Electronics, "Consideration on multi-AP coordination for EHT", doc.: IEEE 802.11-18/1982r1, Jan. 9, 2019 (Jan. 9, 2019), p. 4, 10 total pages.

LG Electronics, "Multi-AP Transmission Procedure ", IEEE 802.11 19/0804r0, May 13, 2019(May 13, 2019), section 2 of p. 2, 14 total pages.

Sony, "Consideration on Multi-AP Ack Protocol", IEEE 802.11-19/1533 r0 Sep. 15, 2019(Sep. 15, 2019), the entire document.

Huawei, "Multi-AP Operation—Basic Definition", IEEE 802.11-20-0617/r1, Apr. 16, 2020(Apr. 16, 2020), p. 4 and p. 5, 20 total pages.

Intel, "Multi-AP Group Formation", IEEE 802.11-19/1616r0, Oct. 10, 2019(Oct. 10, 2019), p. 6, 6 total pages.

Arista Networks, "Considerations for Inter-AP Coordination Estab-lishment", IEEE 802.11-19/1783r0, Nov. 2019 (Nov. 2019), p. 7 and p. 11, 14 total pages.

Calhoun, et al. "Control And Provisioning of Wireless Access Points (CAPWAP) Protocol Specification", Mar. 2009 (Mar. 2009), p. 43, 155 total pages.

ZTE Corporation, "Consideration on Multi-AP Coordination", IEEE 802.11-19/1129r2, Jun. 2019(Jun. 2019), p. 4, 9 total pages.

Mediatek, "Joint Sounding for Multi-AP Systems", IEEE 802.11-19/1593r3, Sep. 12, 2019(Sep. 12, 2019), p. 3 and p. 4, 20 total pages.

Sony, "Consideration on Multi-AP Sounding", IEEE 802.11-19/1134 r1, Aug. 9, 2019(Aug. 9, 2019), p. 7, 13 total pages.

* cited by examiner

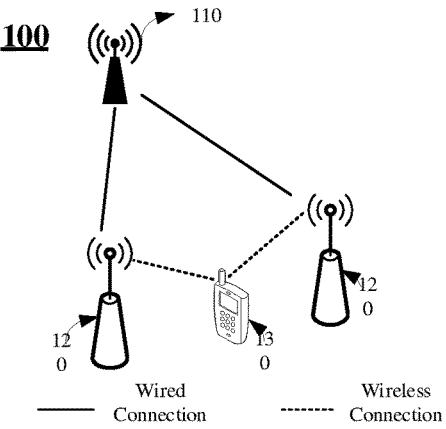

100    110

12 0

12 0

13 0

Wired Connection      Wireless Connection

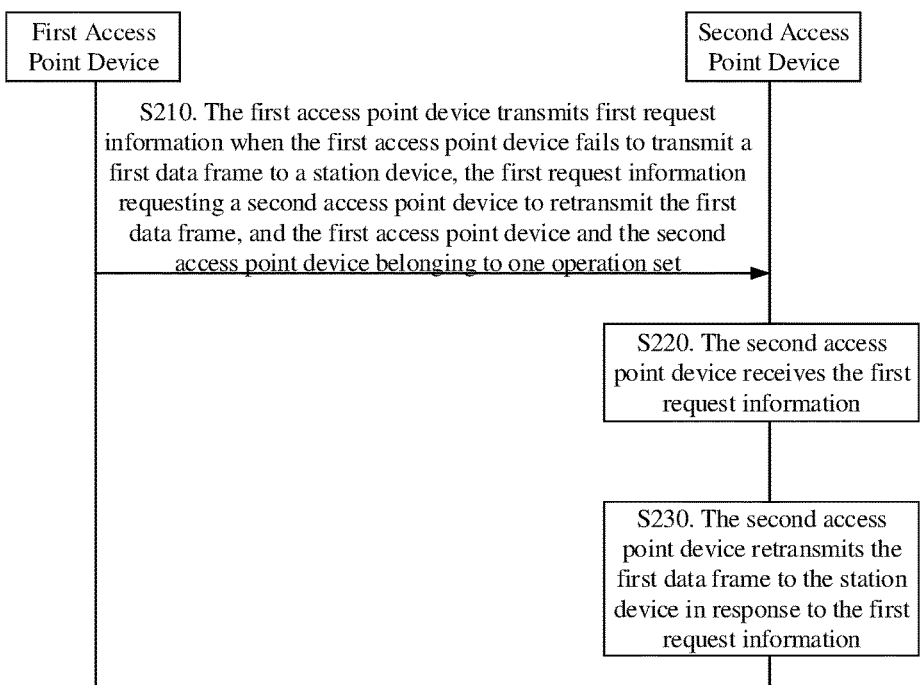

First Access Point Device

Second Access Point Device

S210. The first access point device transmits first request information when the first access point device fails to transmit a first data frame to a station device, the first request information requesting a second access point device to retransmit the first data frame, and the first access point device and the second access point device belonging to one operation set S220. The second access point device receives the first request information S230. The second access point device retransmits the first data frame to the station device in response to the first request information

FIG. 2

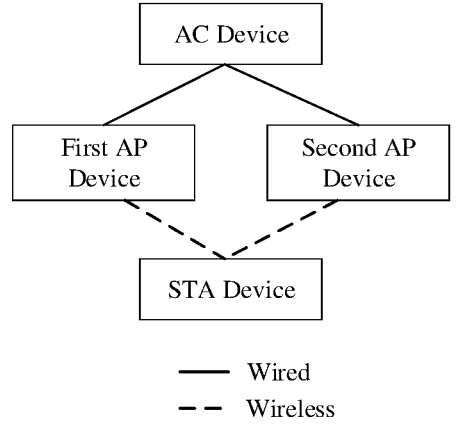
FIG. 3
|  | AP1 | AP2 | AP3 | AP4 | ☐ | APn |
|---|---|---|---|---|---|---|
| AP1 | null | 1 | 1 | 0 | ☐ | 0 |
| AP2 | 1 | null | 0 | 1 | ☐ | 0 |
| AP3 | 1 | 0 | null | 1 | ☐ | 0 |
| AP4 | 0 | 1 | 1 | null | ☐ | 0 |
| ☐ | ☐ | ☐ | ☐ | ☐ | ☐ | ☐ |
| APn | 0 | 0 | 0 | 0 | ☐ | null |
FIG. 4
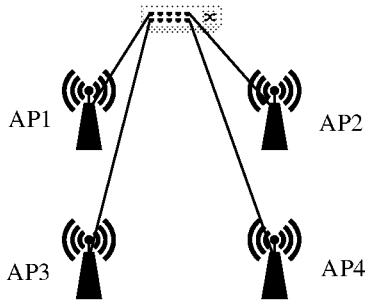
FIG. 5

DATA RETRANSMISSION METHOD AND ACCESS POINT DEVICE

CROSS-REFERENCE TO RELATED APPLICATIONS

This application is a continuation of International Application No. PCT/CN2020/115384 filed on Sep. 15, 2020, the entire disclosure of which is incorporated herein by reference.

TECHNICAL FIELD

The embodiments of the present disclosure relate to communication technology, and more particularly, to a data retransmission method and an access point device.

BACKGROUND

The 802.11be standard introduces multi-Access Point (AP) cooperation. However, in the multi-AP cooperation scenario, how to implement downlink data retransmission is a problem to be solved.

SUMMARY

Embodiments of the present disclosure provide a data retransmission method and an access point device, capable of achieving downlink data retransmission in a multi-AP cooperation scenario, which can reduce the number of downlink data retransmissions and transmission delay, thereby improving user experience.

In a first aspect, a data retransmission method is provided. The method includes: transmitting, by a first access point device, first request information when the first access point device fails to transmit a first data frame to a station device, the first request information requesting a second access point device to retransmit the first data frame, and the first access point device and the second access point device belonging to one operation set.

In a second aspect, a data retransmission method is provided. The method includes: receiving, by a second access point device when a first access point device fails to transmit a first data frame to a station device, first request information, the first request information requesting a second access point device to retransmit the first data frame, the first access point device and the second access point device belonging to one operation set; and retransmitting, by the second access point device, the first data frame to the station device in response to the first request information.

In a third aspect, an access point device is provided. The access point device is configured to perform the method according to the above first aspect.

In particular, the access point device includes one or more functional modules configured to perform the method according to the above first aspect.

In a fourth aspect, an access point device is provided. The access point device is configured to perform the method according to the above second aspect.

In particular, the access point device includes one or more functional modules configured to perform the method according to the above second aspect.

In a fifth aspect, an access point device is provided. The access point device includes a processor and a memory. The memory stores a computer program, and the processor is configured to invoke and execute the computer program stored in the memory to perform the method according to the above first aspect.

In a sixth aspect, an access point device is provided. The access point device includes a processor and a memory. The memory stores a computer program, and the processor is configured to invoke and execute the computer program stored in the memory to perform the method according to the above second aspect.

In a seventh aspect, an apparatus is provided. The apparatus is configured to perform the method according to any of the above first and second aspects.

In particular, the apparatus includes a processor configured to invoke and execute a computer program from a memory, to cause a device provided with the apparatus to perform the method according to any of the above first and second aspects.

In an eighth aspect, a computer-readable storage medium is provided. The computer-readable storage medium stores a computer program that causes a computer to perform the method according to any of the above first and second aspects.

In a ninth aspect, a computer program product is provided. The computer program product includes computer program instructions that cause a computer to perform the method according to any of the above first and second aspects.

In a tenth aspect, a computer program is provided. The computer program, when executed on a computer, causes the computer to perform the method according to any of the above first and second aspects.

With the above technical solutions, when the first access point device fails to transmit the first data frame to the station device, the first access point device requests the second access point device in the same operation set to retransmit the first data frame. That is, the embodiments of the present disclosure can achieve downlink data retransmission in a multi-AP cooperation scenario, and when the service quality of the first access point device is relatively low, the second access point device can transmit data packets, which can reduce the number of downlink data retransmissions and transmission delay, thereby improving user experience.

BRIEF DESCRIPTION OF THE DRAWINGS

FIG. 1 is a schematic diagram showing a communication system architecture according to an embodiment of the present disclosure.

FIG. 2 is a schematic flowchart illustrating a data retransmission method according to an embodiment of the present disclosure.

FIG. 3 is a schematic diagram showing multi-AP transmission according to an embodiment of the present disclosure.

FIG. 4 is a schematic diagram showing AC candidate set storage according to an embodiment of the present disclosure.

FIG. 5 is a schematic diagram showing a square deployment topology according to an embodiment of the present disclosure.

3 4

Figures 6, 7, 8, 9:
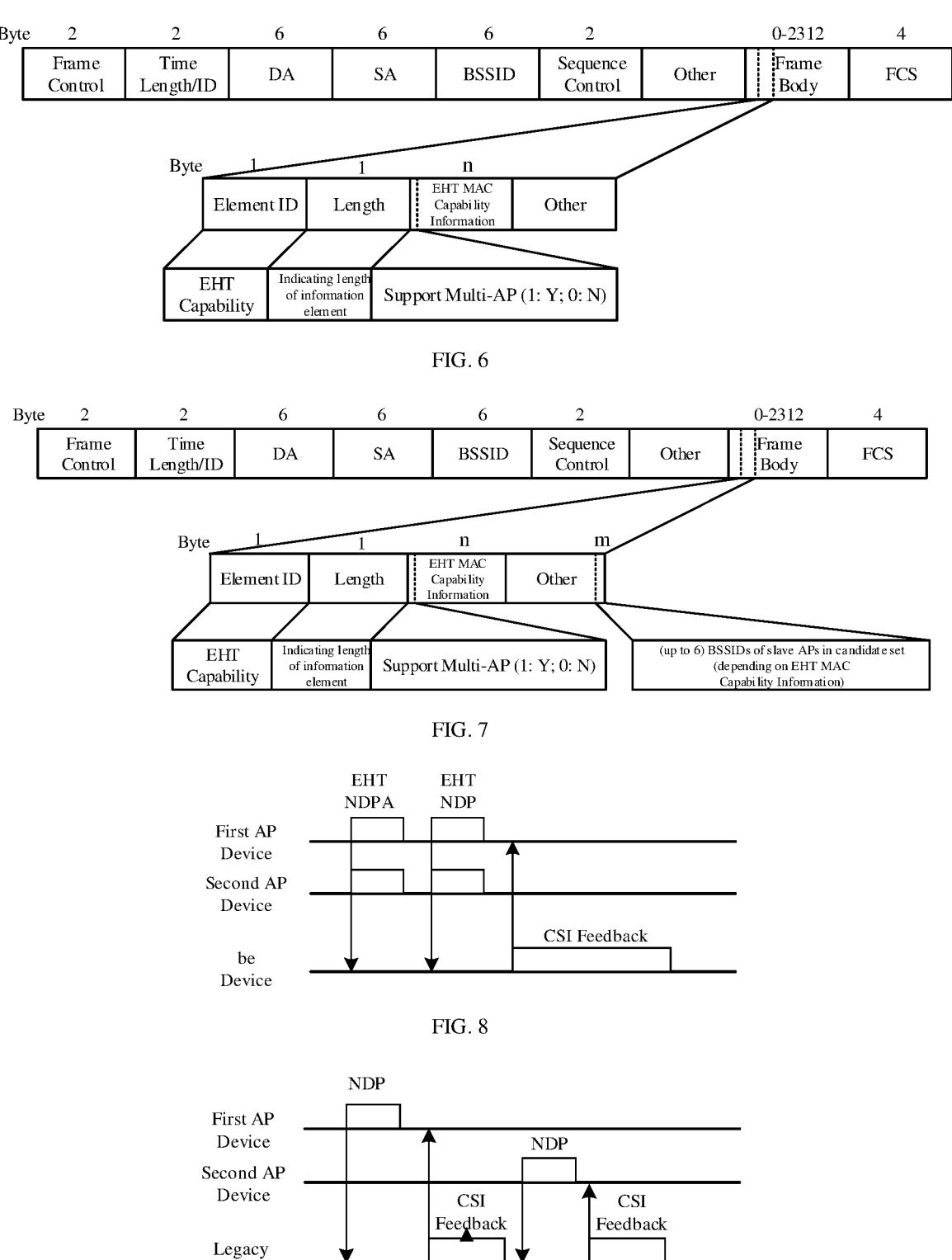
FIG. 6 is a schematic diagram showing a be device association request frame according to an embodiment of the present disclosure.
FIG. 7 is a schematic diagram showing a be device association response frame according to an embodiment of the present disclosure.

FIG. 8 is a schematic diagram showing parallel sounding according to an embodiment of the present disclosure.

FIG. 9 is a schematic diagram showing serial sounding according to an embodiment of the present disclosure.

Figure 10:
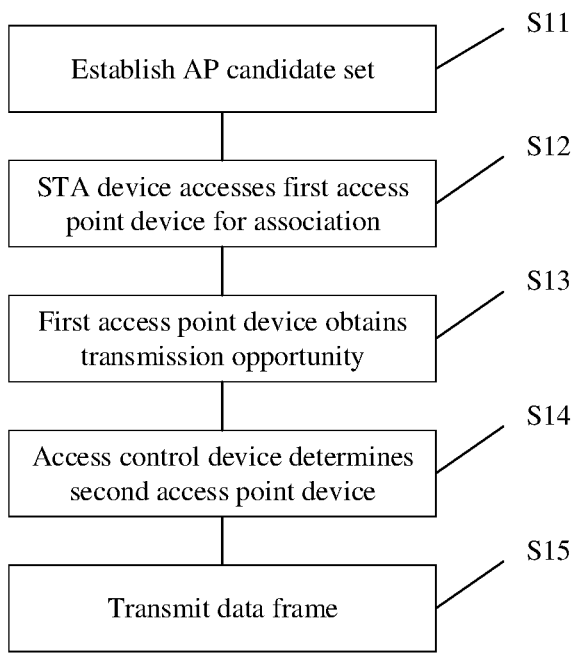

FIG. 10 is a schematic flowchart for establishing an operation set according to an embodiment of the present disclosure.

Figure 11:
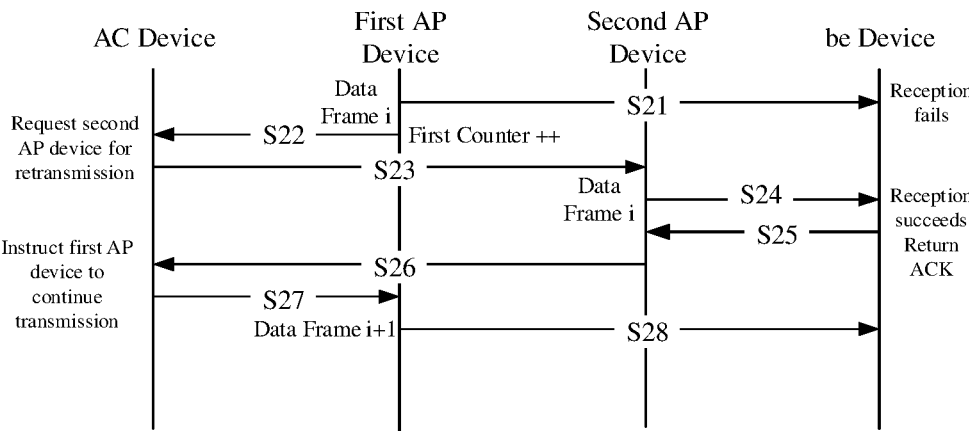

FIG. 11 is a schematic flowchart for retransmitting a data frame by a be device according to an embodiment of the present disclosure.

Figure 12:
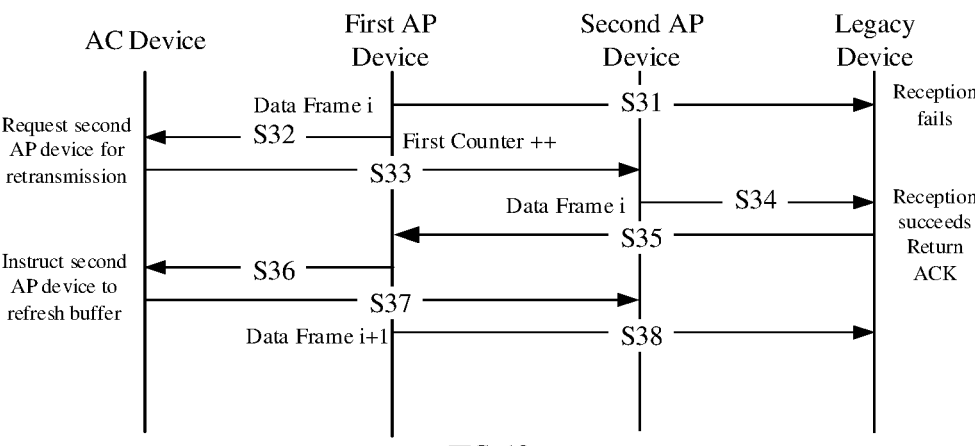

FIG. 12 is a schematic flowchart for retransmitting a data frame by a legacy device according to an embodiment of the present disclosure.

Figure 13:
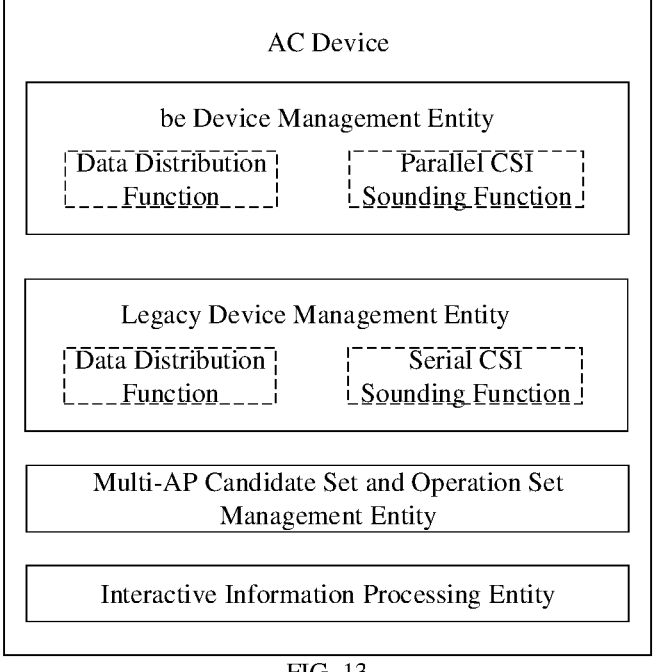

FIG. 13 is a schematic block diagram of an AC device according to an embodiment of the present disclosure.

Figure 14:
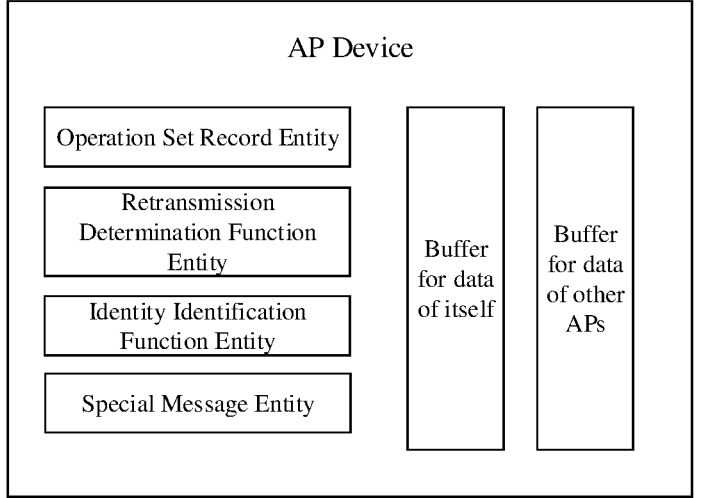

FIG. 14 is a schematic block diagram of an AP device according to an embodiment of the present disclosure.

Figure 15:
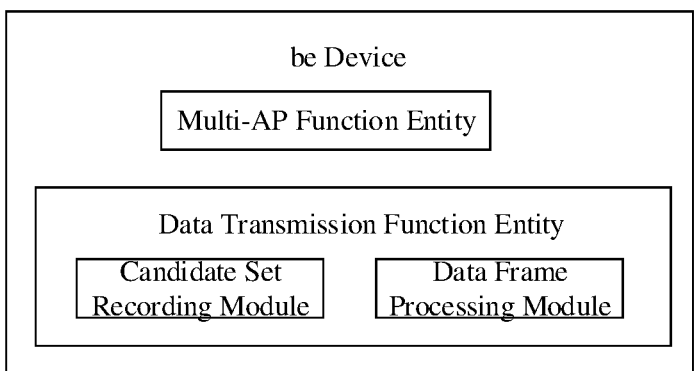

FIG. 15 is a schematic block diagram of a be device according to an embodiment of the present disclosure.

Figure 16:
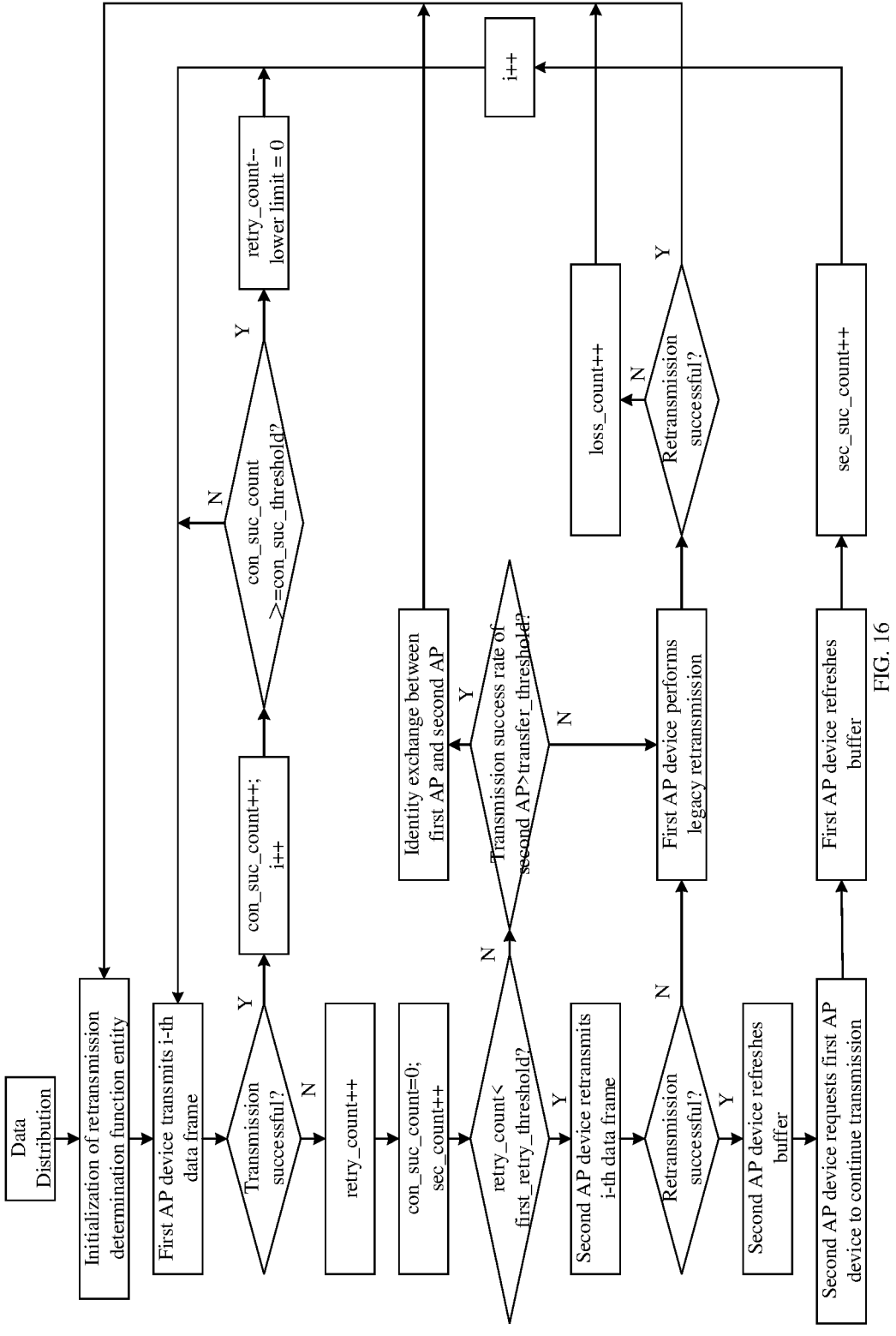

FIG. 16 is a schematic flowchart for transmitting a data frame by a be device according to an embodiment of the present disclosure.

Figure 17:
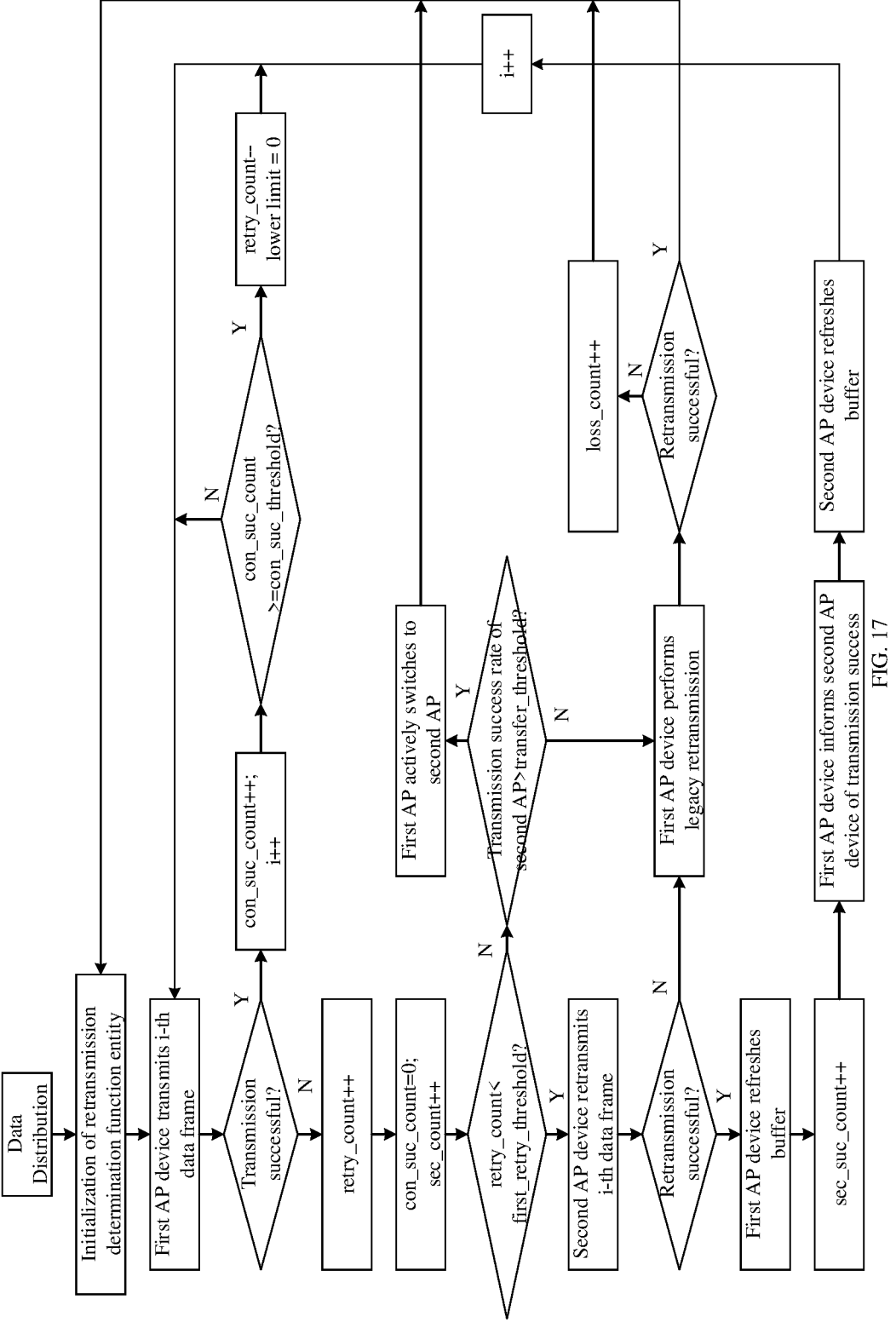

FIG. 17 is a schematic flow chart for transmitting a data frame by a legacy device according to an embodiment of the present disclosure.

Figure 18:
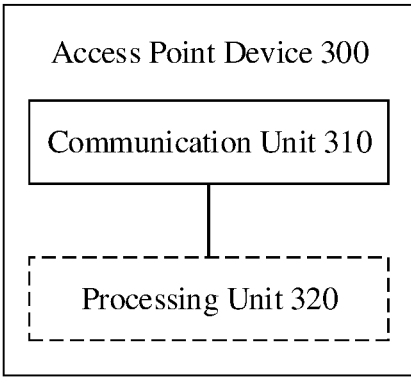

FIG. 18 is a schematic block diagram of an access point device according to an embodiment of the present disclosure.

Figure 19:
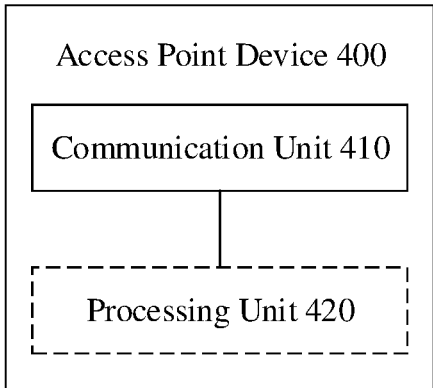

FIG. 19 is a schematic block diagram of another access point device according to an embodiment of the present disclosure.

Figure 20:
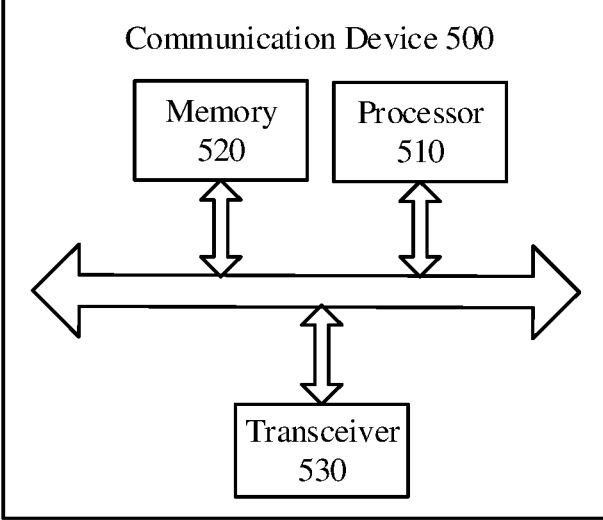

FIG. 20 is a schematic block diagram of a communication device according to an embodiment of the present disclosure.

Figure 21:
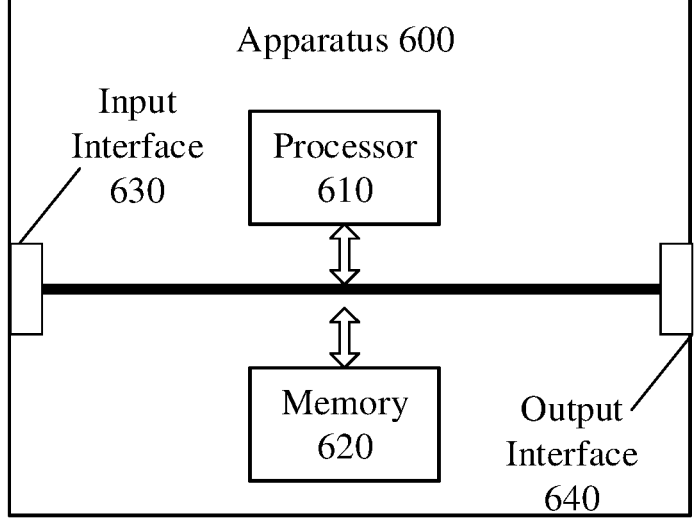

FIG. 21 is a schematic block diagram of an apparatus according to an embodiment of the present disclosure.

Figure 22:
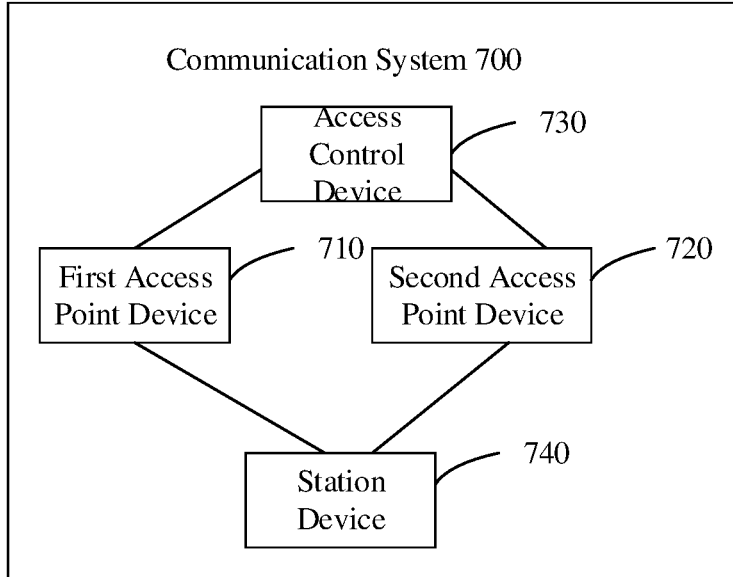

FIG. 22 is a schematic block diagram of a communication system according to an embodiment of the present disclosure.

DETAILED DESCRIPTION

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (Wi-Fi), the 5$^{th}$ Generation (5G) system, or other communication systems.

For the Wi-Fi communication system, the embodiments of the present disclosure can support the 802.11be standard and its subsequent evolved standards, and can also support future developed Wi-Fi standards. Certainly, the embodiments of the present disclosure may also support other 802.11 standards, and the present disclosure is not limited to any of these examples.

Generally, legacy communication systems can support a limited number of connections and are easy to implement. However, with the development of communication technology, mobile communication systems will support not only legacy communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with an Access Control (AC) device, an Access Point (AP) device, and a STATION (STA) device. The STA device can be a station in a WLAN, the AP device can be a FIT AP in the WLAN, and the AC device can be an access controller in the WLAN. Different AP devices among a plurality of AP devices perform information exchange via an access control device.

The STA device may also be referred to as a terminal device, a User Equipment (UE), an access terminal, a user unit, a user station, a mobile station, a remote station, a remote terminal, a mobile device, a user terminal, a terminal, a wireless communication device, a user agent, or a user device.

The STA device may be a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the STA device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the STA device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the STA device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the AP device may be a device communicating with STA devices. The AP device may be a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the AP device may have mobile characteristics, e.g., the AP device may be a mobile device. Optionally, the AP device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the AP device may also be a base station provided in a location such as land or water.

In the embodiment of the present disclosure, the AP device may provide services for a cell, and the STA device may communicate with the AP device over transmission resources, e.g., frequency domain resources or frequency spectral resources, used in the cell. The cell may be a cell corresponding to the AP device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include an access control device 110 which may control a plurality of AP devices 120. Different ones of the plurality of AP devices 120 can communicate with each other via the access control device 110. Each of the plurality of AP devices 120 can communicate with one or more STA devices 130. The AP device 120 may provide communication coverage for a particular geographic area, and may communicate with STA devices located within the coverage.

FIG. 1 exemplarily shows one access control device, two AP devices and one STA device. Optionally, the communication system 100 may include multiple access control devices, and the coverage of each access control device may include other numbers of AP devices, and the coverage of each AP device may include other numbers of STA devices. The embodiment of the present disclosure is not limited to this.

Optionally, the communication system 100 may also include some other network entities. The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the access control device 110, the AP device 120 and the STA device 130 with communication functions. The access control device 110, the AP device 120 and the STA device 130 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are only used to explain specific embodiments of the present disclosure, and are not intended to limit the present disclosure. The terms "first", "second", "third", and "fourth" in the description, claims and drawings of the present disclosure are used to distinguish different objects from each other, rather than to describe a specific order. Furthermore, the terms "include" and "have", as well as any variants thereof, are intended to cover a non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

The 802.11be standard introduces multi-AP cooperation. The multi-AP cooperation technology includes four polices: Joint Transmission (JTX), Coordinated Orthogonal Frequency Division Multiple Access (C-OFDMA), and Coordinated Beamforming (C-BF), and Coordinated Spatial Reuse (C-SR). In order to implement these four polices, it is needed to consider many issues, such as frame interaction design issues between APs, synchronization issues, and so on. In Extremely High Throughput (EHT), a Dynamic Access Point Selection (DAPS) policy is proposed. According to the channel quality between each AP and the STA, multiple APs take turns to transmit downlink data to the STA. This policy helps to improve the service quality for Overlapping Basic Service Set (OBSS) STAs, and is easy to implement. However, there are problems such as how to continuously exchange the channel quality between each AP and the STA between the APs, and how to determine when to perform switching of the transmitting AP.

In addition, the current 802.11 standard is for single-AP transmission. For an STA with low channel quality, multiple retransmissions may occur, and eventually the transmission may fail, resulting in packet loss.

In view of the above problems, the present disclosure provides a data retransmission solution based on multi-AP cooperation, which can reduce the number of downlink data retransmissions and transmission delay, and improve user experience. In addition, this solution is applicable to STA devices supporting the 802.11be standard and legacy STA devices, and has the feature of backward compatibility.

The technical solutions of the present disclosure will be described in detail below with reference to specific examples.

FIG. 2 is a schematic flowchart illustrating a data retransmission method 200 according to an embodiment of the present disclosure. As shown in FIG. 2, the method 200 may include at least some of the following content:

At S210, a first access point device transmits first request information when the first access point device fails to transmit a first data frame to a station device. The first request information requests a second access point device to retransmit the first data frame. The first access point device and the second access point device belong to one operation set.

At S220, the second access point device receives the first request information.

At S230, the second access point device retransmits the first data frame to the station device in response to the first request information.

In the embodiment of the present disclosure, the first access point device and the second access point device cooperate to complete the communication with the station device. Here, in the operation set, an identity of the first access point is initial transmission of data frame, and an identity of the second access point is retransmission of data frame.

It should be noted that the first access point device may transmit the first request information to the second access point device via an access control device. That is, the access control device may forward the first request information transmitted by the first access point device. In this case, for the access control device, the first request information may be transmitted transparently. Of course, in some scenarios, the first access point device may directly communicate with the second access point device. For example, the first access point device may transmit the first request information to the second access point device directly, and the present disclosure is not limited to this.

The access control device may be connected to the first access point device and the second access point device in a wired manner, the first access point device may be connected to the station device in a wireless manner, and the second access point device may be connected to the station device in a wireless manner. The first access point device may communicate with the second access point device via the access control device, as shown in FIG. 3. That is, the first access point device and the second access point device may be FIT APs, and the embodiment of the present disclosure can be applied in an AC+FIT AP architecture.

Certainly, the access control device may be connected to the first access point device and the second access point device in a wireless manner, and the embodiment of the present disclosure is not limited to this.

It should be noted that the information exchanged between the access point device and the access control device may be a special data message, referring to e.g., Control And Provisioning of Wireless Access Points Protocol Specification (CAPWAP) protocol.

In the embodiment of the present disclosure, a station device that supports the 802.11be standard may be referred to as a be device, and a station device that does not support the 802.11be standard may be referred to as a legacy device.

It should be noted that the AC device can be connected to a plurality of AP devices in a wired manner, and determine neighboring AP devices of each AP device according to a topology structure of the AP devices during network deployment, and construct a candidate set for each AP device (itself and all neighboring AP devices). The neighboring AP devices in each candidate set are referred to as slave AP devices. Three network deployment schemes are considered here: square deployment (the number of slave AP devices in the candidate set is 4), cellular deployment (the number of slave AP devices in the candidate set is 6), and random deployment (the candidate set is constructed according to the actual location of the AP devices). Generally, the number of slave AP devices does not exceed 6.

In addition, the storage form of the candidate set can be represented by a two-dimensional array. As shown in FIG. 4, a row indicates which AP is used as a master AP of the candidate set, and a column corresponding to the row indicates whether a certain AP is the slave AP of the master AP (0 means no, and 1 means yes). The topology structure corresponding to the stored values may be shown in FIG. 5, where the APs on the diagonal are not neighboring APs.

The AC device needs to update and maintain the candidate set. If a new AP goes online, the AC device needs to define a candidate set for it according to its location, and update the two-dimensional array storing the candidate set. If an AP goes offline, the AC device should keep the row such that when the AP comes online again, its candidate set does not need to be defined.

For a device, either be or legacy, a standard-defined access process is adopted (such as active scanning or passive scanning, followed by link authentication).

The be device needs to interact with a master AP device for multi-AP related information during the association phase of access. The be device transmits Information A to the master AP device, indicating that the be device has the multi-AP transmission capability (a legacy device uses the 802.11 standard and the Control And Provisioning of Wireless Access Points Protocol Specification (CAPWAP) protocol for association). Then the master AP device forwards the Information A to the AC device, and the AC device determines the type of the accessing STA device (be device or legacy device) based on the Information A, and store the type information of the STA device in a corresponding management entity (the management entity can be provided in the access control device, such as be device management entity or legacy device management entity). Then the AC device will reply with an association result. For the be device, the AC device will inform the be device of the slave AP information in the candidate set of the master AP device via the master AP device. For the legacy device, the AC device will reply according to the 802.11 standard and the CAPWAP protocol. After receiving the reply information, the be device records the Basic Service Set Identifiers (BSSIDs) of these slave APs in a candidate set recording module.

It should be noted that the exchange information between the AP device and the AC device, including an association request frame transmitted by the AP device during association, and an association response frame returned by the AC device during association, both belong to management frames. That is, for the be device, it is necessary to design an association request frame and an association response frame that support the multi-AP function.

The association request frame transmitted by the be device may contain support for multi-AP as Extremely High Throughput (EHT) Media Access Control (MAC) capability information. The EHT MAC capability information may occupy n bytes. Specifically, the frame format of the association request frame can be shown in FIG. 6, and the association request frame further includes: frame control (2 bytes), time length/identifier (ID) (2 bytes), Destination Address (DA) (6 bytes), Source Address (SA) (6 bytes), BSSID of master AP device (6 bytes), sequence control (2 bytes), other, frame body (0-2312 bytes), and Frame Check Sequence (FCS) (4 bytes). Here, the frame body includes: element ID (1 byte), EHT capability; length (1 byte), indicating the length of the information element; EHT MAC capability information (n bytes), e.g., including one bit indicating support for multi-AP (1: yes, 0: no), and other.

The association response frame returned by the AC device may contain support for multi-AP as EHT MAC capability information, and carry the BSSID information of the slave APs in the candidate set. Specifically, the frame format of the association response frame can be shown in FIG. 7, and the association response frame further includes: frame control (2 bytes), time length/ID (2 bytes), DA (6 bytes), SA (6 bytes), BSSID of master AP device (6 bytes), sequence control (2 bytes), other, frame body (0-2312 bytes), and FCS (4 bytes). Here, the frame body includes: element ID (1 byte), EHT capability; length (1 byte), indicating the length of the information element; EHT MAC capability information (n bytes), e.g., including one bit indicating support for multi-AP (1: yes, 0: no), and other, including BSSIDs of (up to 6) slave APs in the candidate set. The BSSIDs of the slave APs in the candidate set occupy m bytes. In addition, the BSSIDs of the slave APs in the candidate set can be determined from the EHT MAC capability information.

The AC device determines the subsequent transmission mode according to the device type, and the be device stores the BSSIDs of the slave APs in the candidate set to ensure that the subsequent data frames from these APs can be received.

In an embodiment of the present disclosure, after the first access point device obtains a transmission opportunity (TXOP), it first determines whether an operation set needs to be established, and if the Channel State Information (CSI) between the first access point device and the station device is smaller than a CSI threshold (CSI_threshold), it means that cooperative transmission is required, that is, an operation set needs to be established.

The first access point device reports a special message (request for establishing an operation set) to the access control device, and the access control device notifies the AP device in the candidate set corresponding to the first access point device to perform explicit sounding to obtain the CSI between the AP device and the station device. For example, for the be device, a parallel sounding (joint NDP sounding) mode is used, and for the legacy device, a serial sounding mode is used (the legacy device does not support joint NDP sounding).

Specifically, for the be device, the parallel sounding (joint NDP sounding) mode is adopted, as shown in FIG. 8.

Assuming that the be device is in the service area of both the first AP device and the second AP device, first the first AP device and the second AP device simultaneously transmit an EHT Null Data Packet Announce (NDPA) to the be device. Then, the first AP device and the second AP device simultaneously transmit an EHT Null Data Packet (NDP) to the be device. Finally, the be device transmits a CSI feedback to the first AP device, that is, the be device feeds back the joint CSI to the first AP device. The first AP device can determine the AP set that can participate in the cooperative transmission according to the feedback information, and reports a special message (requesting the APs in the AP set to join the operation set, including the CSI of the APs in the AP set) to the AC device. The AC device forwards the special message (requesting the APs in the AP set to join the operation set, including the CSI of the APs in the AP set) to the APs in the AP set. After receiving the request, each AP in the AP set decides whether to report a special message (report load and data buffer information) to the AC device according to its own load and data buffer condition. Then, the AC device selects the second AP device according to a certain algorithm (for example, based on a weighted combination of CSI, load condition, and data buffer condition), and notifies the first AP device and the second AP device of the BSSID information of the selected second AP device and the BSSID information of the first AP device, respectively. The first AP device stores the BSSID information of the first AP device and the BSSID information of the second AP device in its operation set record entity, determines the type of the STA device according to the operation flow, and records it in the operation set record entity. The second AP device also stores the BSSID information of the first AP device and the BSSID information of the second AP device in its operation set record entity, determines the type of the STA device according to the operation flow, and records it in the operation set record entity. That is, for the be device, the operation set is obtained by parallel sounding.

Specifically, for the legacy device, a serial sounding mode is adopted, as shown in FIG. 9. Assuming that the legacy device is in the service area of both the first AP device and the second AP device, the first AP device and the second AP device each transmit an NDP to the legacy device. The legacy device feeds back CSI to each slave AP in the candidate set. Each slave AP decides whether to report a special message (report CSI, load, and data buffer information) to the AC device according to its own load and data buffer condition, i.e., the AP in the candidate set decides whether to participate in the cooperative transmission. Then the AC device selects the second AP device according to a certain algorithm (for example, based on a weighted combination of CSI, load condition, and data buffer condition), and notifies the first AP device and the second AP device of the BSSID information of the selected second AP device and the BSSID information of the first AP device, respectively. The first AP device stores the BSSID information of the first AP device and the BSSID information of the second AP device in its operation set record entity, determines the type of the STA device according to the operation flow, and records it in the operation set record entity. The second AP device also stores the BSSID information of the first AP device and the BSSID information of the second AP device in its operation set record entity, determines the type of the STA device according to the operation flow, and records it in the operation set record entity. That is, for the legacy device, the operation set is obtained by serial sounding.

For the be device, the special data message will be described below.

The first AP device requests to establish an operation set. The first AP device requests the slave APs whose CSI meets the standard to join the operation set (report the CSI of the slave APs). The slave APs report the load and data buffer information.

The salve AP processes the request sounding message from the AC device. The first AP device processes the BSSID information of the first AP device and the BSSID information of the second AP device transmitted by the AC device, and stores them in the operation set record entity (recording the identities of the first AP device and the second AP device). The second AP device processes the BSSID information of the first AP device and the BSSID information of the second AP device transmitted by the AC device, and stores them in the operation set record entity (recording the identities of the first AP device and the second AP device). The second AP device processes the message in which the first AP device requests the set of slave APs whose CSI meets the standard to join the operation set.

For the legacy device, the special data message will be described below.

The first AP device requests for establishing an operation set. The slave APs report CSI, load and data buffer information.

The salve AP processes the request sounding message from the AC device. The first AP device processes the BSSID information of the first AP device and the BSSID information of the second AP device transmitted by the AC device, and stores them in the operation set record entity (recording the identities of the first AP device and the second AP device). The second AP device processes the BSSID information of the first AP device and the BSSID information of the second AP device transmitted by the AC device, and stores them in the operation set record entity (recording the identities of the first AP device and the second AP device).

It should be noted that, in the embodiment of the present disclosure, each AP device may have two data buffers of the same size, one for data of itself and the other for data of other APs. In addition, in some scenarios, if a certain AP needs to serve as the second AP for a plurality of first APs, the plurality of data buffers for data of other APs may be provided.

Optionally, in an embodiment of the present disclosure:

The first access point device may include a first data buffer and a second data buffer. The first data buffer is configured to buffer data of the first access point device itself, and the second data buffer is configured to buffer data of other access point devices.

The second access point device may include a third data buffer and a fourth data buffer. The third data buffer is configured to buffer data of the second access point device itself, and the fourth data buffer is configured to buffer data of other access point devices.

Here, the first data frame is buffered in both the first data buffer and the fourth data buffer.

Optionally, content buffered in the first data buffer may be same as content buffered in the fourth data buffer.

Optionally, the first data buffer may be refreshed when the first access point device receives a new data frame; and/or the fourth data buffer may be refreshed when an access control device simultaneously distributes a data frame to the first access point device and the second access point device, or the fourth data buffer may be refreshed when the first access point device requests the second access point device to retransmit a data frame.

That is, the AC device distributes a new data frame to the first AP device and the second AP device at the same time. At this time, the second AP device receives the new data frame, and refreshes the buffer for data of other APs (the fourth data buffer) in a queue (FIFO), to ensure that the content of the refreshed buffer is consistent with that of the buffer for data of itself (first data buffer). In addition, when the transmission of the first access point device fails, the AC device requests the second access point device to perform retransmission, and the second access point device refreshes the buffer for data of other APs (the fourth data buffer) according to the sequence number of the retransmitted data frame.

For example, after the operation set is determined, the AC device distributes a data frame to the first AP device and the second AP device. The first access point device stores the data frame into the buffer for data of itself (the first data buffer), and the second access point device encapsulates the data according to the device type in the operation set record entity, and puts it into the buffer for data of other APs (the fourth data buffer). All data frames have their identifiers, which may be sequence numbers of the data frames, so as to refresh the buffer during subsequent transmission.

It should be noted that, in the second access point device, for the be device, the sending address is the BSSID of the second access point device, and for the legacy device, the sending address is the BSSID of the first access point device. For the be device, it has a candidate set recording module, which can receive downlink data frames from the slave APs in the candidate set, and thus the second access point device can retransmit the data frames of the first access point device using its own identity. For the legacy device, it can receive only downlink data frames from the first access point device, and thus the second access point device can retransmit the data frames of the first access point device using the identity of the first AP device.

In an embodiment of the present disclosure, before data transmission, an operation set needs to be established to achieve multi-AP cooperative transmission. Specifically, Steps S11 to S14 in the process shown in FIG. 10 need to be performed. Specifically, as shown in FIG. 10, an AP candidate set is established in S11. An STA device accesses a first access point device for association in S12, where the STA device and the first access point device have interactive multi-AP cooperation capabilities. The first access point device obtains a transmission opportunity (TXOP) in S13. An access control device determines a second access point device in S14. A data frame is transmitted in S15.

Optionally, in an embodiment of the present disclosure, the first access point device maintains and/or updates at least one of:

a first counter configured to record a number of retransmissions by the second access point device, where the count value of the first counter is decremented by 1 when a number of consecutive successful transmissions by the first access point device reaches a predetermined value;

a second counter configured to record a number of transmissions by the second access point device;

a third counter configured to record a number of successful transmissions by the second access point device;

a fourth counter configured to record a number of times data frames are lost; or a fifth counter configured to record a number of consecutive successful transmissions by the first access point device.

Optionally, the predetermined value may be 3, for example. That is, the count value of the first counter is decremented by 1 when the number of consecutive successful transmissions by the first access point device reaches 3. Certainly, the predetermined value may be other values, and the embodiment of the present disclosure is not limited to this.

In addition, the predetermined value may be agreed in a protocol, configured by the first access point device, configured by the access control device, or determined by negotiation between the access control device and the first access point device.

It should be noted that a number of consecutive successful transmissions by the first access point device indicates that the service quality of the first access point device has improved, and the first access point device can continue to transmit data frames.

For the fourth counter, the loss of the data frame can be understood as: if a certain data frame is not successfully transmitted after a number of consecutive transmissions, then the transmission of the data frame is abandoned, and in this case, the data frame may be lost.

Optionally, in an embodiment of the present disclosure, for the be device, if the second access device successfully retransmits the first data frame to the STA device, the first access point device receives first response information transmitted by the second access point device. The first response information instructs the first access point device to continue transmitting data frames. The first access point device transmits a second data frame to the STA device.

For the be device, the sending address for the second access point device to retransmit the first data frame is the BSSID of the second access point device.

As Example 1, the STA device is a be device, and as shown in FIG. 11, the specific retransmission process is as follows:

At S21, the first AP device transmits a data frame i to the be device, and the be device fails to receive the data frame i (for example, when the ACK timer expires, the first AP device does not receive an Acknowledgment (ACK) fed back by the be device.

At S22, the first AP device transmits request information to the AC device, the request information requesting the second AP device to retransmit the data frame i, and the count value of the first counter is incremented by 1.

At S23, the AC device forwards the request information to the second AP device.

At S24, the second AP device retransmits the data frame i to the be device, with the sending address being the BSSID of the second AP device.

At S25, the second AP device receives an ACK fed back by the be device for the transmission of the data frame i.

At S26, the second AP device transmits response information to the AC device, the response information instructing the first AP device to continue transmitting data frames.

At S27, the AC device forwards the response information to the first AP device.

At S28, the first AP device transmits the data frame i+1 to the be device.

Optionally, in an embodiment of the application, for the be device, when a count value of a first counter reaches a first threshold, the first access point device may determine whether to exchange identity information of the first access point device and the second access point device in the operation set.

Here, the first counter is configured to record a number of retransmissions by the second access point device, and the count value of the first counter is decremented by 1 when a number of consecutive successful transmissions by the first access point device reaches a predetermined value.

In the operation set, an identity of the first access point is initial transmission of data frame, and an identity of the second access point is retransmission of data frame.

It should be noted that after the identity information of the first access point device and the second access point device are exchanged, all counters are still maintained and/or updated by the first access point device.

Specifically, the first access point device may determine to exchange the identity information of the first access point device and the second access point device in the operation set when a transmission success rate of the second access point device is greater than a second threshold, or the first access point device may determine not to exchange the identity information of the first access point device and the second access point device in the operation set when the transmission success rate of the second access point device is smaller than or equal to the second threshold.

Optionally, when the first access point device determines to exchange the identity information of the first access point device and the second access point device in the operation set, the first access point device may transmit a second request information, the second request information requesting to exchange the identity information of the first access point device and the second access point device in the operation set.

Specifically, the first access point device may transmit the second request information to the second access point device via the access control device.

Correspondingly, when the first access point device determines to exchange the identity information of the first access point device and the second access point device in the operation set, the second access point device receives the second request information, the second request information requesting to exchange the identity information of the first access point device and the second access point device in the operation set, and in response to the second request information, the second access point device exchanges the identity information of the first access point device and the second access point device in the operation set.

Optionally, in an embodiment of the present disclosure, for the legacy device, when the second access device successfully retransmits the first data frame to the station device, the first access point device may receive second response information transmitted by the station device, the second response information indicating that the station device has successfully received the first data frame. The first access point device may transmit a second data frame to the station device.

For the legacy device, the sending address for the second access point device to retransmit the first data frame is the BSSID of the first access point device.

Optionally, the first access point device may transmit first indication information, the first indication information instructing the second access point device to refresh a buffer configured to buffer data of other access point devices.

Correspondingly, when the retransmission of the first data frame succeeds, the second access point device receives first indication information, the first indication information instructing the second access point device to refresh a buffer configured to buffer data of other access point devices. The second access point device refreshes the buffer configured to buffer the data of other access point devices according to the first indication information.

As Example 2, the station device is a legacy device, and as shown in FIG. 12, the specific retransmission process is as follows:

At S31, the first AP device transmits a data frame i to the legacy device, and the legacy device fails to receive the data frame i (for example, when the ACK timer expires, the first AP device does not receive an ACK fed back by the legacy device).

At S32, the first AP device transmits request information to the AC device, the request information requesting the second AP device to retransmit the data frame i, and the count value of the first counter is incremented by 1.

At S33, the AC device forwards the request information to the second AP device.

At S34, the second AP device retransmits the data frame i to the legacy device, with the sending address being the BSSID of the first AP device.

At S35, the first AP device receives the ACK fed back by the legacy device for the transmission of the data frame i.

At S36, the first AP device transmits indication information to the AC device, the indication information instructing the second AP device to refresh a buffer configured to buffer data of other access point devices.

At S37, the AC device forwards the indication information to the second AP device.

At S38, the first AP device transmits a data frame i+1 to the legacy device.

Optionally, in an embodiment of the present disclosure, for the legacy device, when a count value of a first counter reaches a first threshold, the first access point device may determine whether an access point device associated with the station device is switched from the first access point device to the second access point device.

Here, the first counter is configured to record a number of retransmissions by the second access point device, and the count value of the first counter is decremented by 1 when a number of consecutive successful transmissions by the first access point device reaches a predetermined value.

Specifically, the first access point device may determine that the access point device associated with the station device is switched from the first access point device to the second access point device when a transmission success rate of the second access point device is greater than a second threshold, or the first access point device may determine that the access point device associated with the station device is not switched from the first access point device to the second access point device when the transmission success rate of the second access point device is smaller than or equal to the second threshold.

Optionally, when the first access point device determines that the access point device associated with the station device is switched from the first access point device to the second access point device, the first access point device may transmit third request information, the third request information requesting to switch the access point device associated with the station device from the first access point device to the second access point device.

Specifically, the first access point device may transmit the third request information to the second access point device via the access control device.

Correspondingly, when the first access point device determines that the access point device associated with the station device is switched from the first access point device to the second access point device, the second access point device receives third request information, the third request information requesting to switch the access point device associated with the station device from the first access point device to the second access point device. In response to the third request information, the second access point device associates with the station device.

Optionally, in an embodiment of the present disclosure, the transmission success rate of the second access point device may be determined according to a count value of a second counter and a count value of a third counter. The second counter is configured to record a number of transmissions by the second access point device, and the third counter is configured to record a number of successful transmissions by the second access point device.

Optionally, the second threshold may be determined according to a count value of a third counter and a count value of a fourth counter. The third counter is configured to record a number of successful transmissions by the second access point device, and the fourth counter is configured to record a number of times data frames are lost.

Optionally, the second threshold may be calculated by:

$$\text{the second threshold} = 1 - (C_1 + C_2)/(i-1),$$

where $C_1$ is the count value of the third counter, $C_2$ is the count value of the fourth counter, i is an identifier of a current data frame or i is a difference between the identifier of the current data frame and an identifier of the data frame before identity exchange or i is a difference between the identifier of the current data frame and the identifier of the data frame before the access point device switching.

Therefore, in the embodiment of the present disclosure, when the first access point device fails to transmit the first data frame to the station device, the first access point device requests the second access point device in the same operation set to retransmit the first data frame. That is, the embodiments of the present disclosure can achieve downlink data retransmission in a multi-AP cooperation scenario, and when the service quality of the first access point device is relatively low, the second access point device can transmit data packets, which can reduce the number of downlink data retransmissions and transmission delay, thereby improving user experience.

In addition, the embodiment of the present disclosure can reduce the number of times packets are lost and improve downlink transmission efficiency for users in the OBSS.

Further, for the station device, multiple APs are used to serve it. The be device can receive downlink data frames from multiple APs, and the legacy device can only receive downlink data frames from the associated APs. The AC device distributes data frames to the first AP device and the second AP device, and the second AP device encapsulates the data frames differently depending on the type of the station device. For the be device, the sending address of the data frame is set to the BSSID of the second AP device. For the legacy device, the sending address of the data frame is set to the BSSID of the first AP device.

When the transmission by the first AP device fails, the first AP device requests the second AP device to perform data retransmission. If the reception succeeds, for the be device, it returns an ACK to the second AP device, and for the legacy device, it returns an ACK to the first AP device.

If the transmission quality of the first AP device is not as good as that of the second AP device, for the be device, the identity exchange between the first AP device and the second AP device is performed, and the second AP device serves the station device, and for the legacy device, the associated access point device is switched from the first AP device to the second AP device.

To summarize, in the embodiment of the present disclosure, when the service quality of the first AP device is relatively low, the second AP device can transmit the data packet, reducing the number of retransmissions by the first AP device. When the transmission success rate of the second AP device is higher than that of the first AP device, the serving AP is switched from the first AP device to the second AP device. Therefore, the embodiment of the present disclosure can effectively reduce the retransmission time on one hand, and guarantee the success rate of downlink transmission to a certain extent on the other hand. In addition, the design of the identity change/switching threshold in the embodiment of the present disclosure can further ensure the quality of data transmission.

The data frame transmission schemes of the be device and the legacy device will be described in detail below with reference to Embodiment 1 and Embodiment 2, respectively. Specifically, the AC device may include: a be device management entity, a legacy device management entity, a multi-AP candidate set and operation set management entity, and an interactive information processing entity. The be device management entity has a data distribution function and a parallel CSI sounding function, and the legacy device management entity has a data distribution function and a serial CSI sounding function, as shown in FIG. 13. The AP device may include: an operation set record entity, a retransmission determination function entity, an identity identification function entity, a special message entity, a buffer for data of itself, and a buffer for data of other APs, as shown in FIG. 14. The be device may include: a multi-AP function entity and a data transmission function entity. The data transmission function entity includes a candidate set recording module and a data frame processing module, as shown in FIG. 15.

In Embodiment 1, the station device is a be device, the data frame transmission may be as shown in FIG. 16, and the specific data frame transmission process may be as described in S41-S49.

At S41, in the AC+FIT AP architecture, the AC device determines the neighboring AP devices of each AP device according to the topology of multiple AP devices, and constructs a candidate set for each AP device (itself and all neighboring AP devices (neighboring APs are slave APs)), and stores it in the multi-AP candidate set and operation set management entity in the AC device in the form of a two-dimensional array. The AC device updates and maintains the candidate set. If a new AP device goes online, the AC device defines a candidate set for it according to its location, and updates the candidate set to store a two-dimensional array. If an AP device goes offline, the AC device should maintain the candidate set corresponding to the AP device, such that the candidate set does not need to be defined when the AP device goes online again.

At S42, the be device interacts with the first AP device for multi-AP related information during access. In the association phase, the be device transmits a be device association request (be association request) frame via the multi-AP function entity, with a frame format as shown in FIG. 6, to inform the AC device that the be device supports the multi-AP transmission function. Subsequently, the AC device replies with a be device association response (be association response) frame, as shown in FIG. 7, including information on slave APs in the candidate set of the first AP device. The be device information is stored in the be device management entity of the AC device. After the be device receives the be association response frame, it records the BSSIDs of all APs in the candidate set into the candidate set recording module.

At S43, after the first AP device obtains the TXOP, it first determines whether a cooperation set needs to be established. If the CSI between the first AP device and the be device is smaller than CSI_threshold, it indicates that cooperative transmission is required.

Further, the first AP device reports a special message requesting to establish an operation set to the special message entity, and the AC device informs the slave APs in the candidate set corresponding to the first AP device via the interactive information processing entity to perform explicit sounding, and obtains the CSI between the slave AP and the be device by using a parallel sounding method, as shown in FIG. 8. First, the first AP device and the second AP device simultaneously transmit an EHT NDPA to the be device. Then, the first AP device and the second AP device simultaneously transmit an EHT NDP to the be device. Finally, the be device transmit an NDP feedback to the first AP device, that is, the be device feeds back the joint CSI to the first AP device. According to the feedback information, the first AP device can determine the set of APs participating in the cooperative transmission, and report a special message for requesting the APs in the set of APs to join the operation set to the special message entity, including the CSI information of the APs in the set of APs. The AC device forwards the request message to the APs in the set of APs via the interactive information processing entity. After receiving the request, each AP in the set of APs decides whether to report a special message of the load and data buffer information to the AC device according to its own load and data buffer condition. After the APs in the set of APs have reported, the AC device selects the second AP device according to the weighted combination of each AP's CSI, load condition, and data buffer condition, and informs the first AP device and the second AP device of the BSSID information of the selected second AP device and the BSSID information of the first AP device, respectively, via the interactive information processing entity. The first AP device stores the BSSID information of the first AP device and the BSSID information of the second AP device in its operation set record entity, determines the type of the station device according to the operation flow, and records it in the operation set record entity. The second AP device also stores the BSSID information of the first AP device and the BSSID information of the second AP device in its operation set record entity, determines the type of the station device according to the operation flow, and records it in the operation set record entity. That is, for the be device, the operation set is obtained by parallel sounding.

At S44, the AC device distributes the data frame to the first AP device and the second AP device. The first AP device stores the data frame into the buffer for data of itself. The second AP device encapsulates the data according to the type of the station device in the operation set record entity, and stores it into the buffer for data of other APs. All data frames are numbered such that the buffers can be refreshed during subsequent transmissions. In the second AP device, for the be device, the sending address of the data frame is the BSSID of the second AP device.

It should be noted that the method for refreshing the buffer for data of other APs in the second AP device (the action of triggering refresh) includes:

Action 1: The AC device simultaneously distributes a new data frame to the first AP device and the second AP device. At this time, the second AP device receives the new data frame and refreshes the buffer for data of other APs in a queue (first in first out), to ensure that after refreshing, it is consistent with the content of the buffer for data of itself in the first AP device.

Action 2: When the first AP device fails to transmit, it requests the second AP device for retransmission via the AC device, and the second AP device refreshes the buffer for data of other APs of the second AP device according to the sequence number of the retransmitted data frame.

At S45, the first AP device initializes a retransmission counter (retry_count=0, with a lower limit of 0).

At S45-1, the first AP device initializes a counter in the retransmission determination function entity, and maintains a threshold parameter. The first AP device initializes: a second AP device transmission counter (sec_count=0), a second AP device transmission success counter (sec_suc_count=0), a first AP device consecutive transmission success counter (con_suc_count=0, with an upper limit of con_suc_threshold, which can be set to 3 to determine whether to decrement the retransmission counter by 1: in case of a number of consecutive successful transmissions, it means that the first AP device can continue transmission, and the count value of retry_count is decremented by 1), and a data frame loss counter (loss_count=0).

In addition, the first AP device maintains a first AP retransmission threshold (first_retry_threshold, for comparison with retry_count), maintains and updates a first AP device identity switching threshold (transfer_threshold), maintains a consecutive successful transmission threshold (con_suc_threshold), maintains a retransmission timer (ACK_time), and maintains a second AP device retransmission timer (retry_delay_time).

At S45-2, the first AP device transmits the i-th data frame (starting from 0), the be device receives it successfully, and returns an ACK to the first AP device, and the consecutive transmission success counter con_suc_count is incremented by 1 (if con_suc_count is not smaller than con_suc_threshold, then retry_count is decremented by 1), and then the first AP device transmits the next data frame (i=i+1); and step S45-2 is performed cyclically. If the first AP device does not receive the ACK after the ACK_time expires, it performs S46.

At S46, retry_count of the first AP device is incremented by 1, con_suc_count is set to 0, sec_count in the first AP device is incremented by 1, the count value of retry_count is compared with first_retry_threshold, and if it is smaller than first_retry_threshold (for example, if it is set to 2 or 3), then the process proceeds with S47, or otherwise the process proceeds with S49.

At S47, the first AP device requests the second AP device to retransmit the data frame that the first AP device fails to transmit by reporting to the special message entity, and sets the second AP device retransmission timer (retry_delay_time). The AC device forwards the request via the interactive information processing entity. If the first AP device receives the message from the second AP device via the special message entity within the retry_delay_time, instructing the first AP to continue transmission, it means that the second AP device retransmits successfully. The process of the successful retransmission is shown in FIG. 11, and the specific process is as follows. Otherwise, the process proceeds with S48.

The second AP device processes the retransmission request message from the first AP device, and starts to retransmit the i-th data frame. The be device returns an ACK to the second AP device after successfully receiving the data frame. After receiving the ACK, the second AP device refreshes the buffer for data of other APs, and transmits a message to the first AP device via the AC device to instruct the first AP device to continue transmission. The first AP device processes the relevant message, refreshes the buffer for data of itself, and increments sec_suc_count by 1, i=i+1. The process returns to S45-2.

At S48, if the first AP device does not receive the message instructing the first AP device to continue transmission from the second AP device within retry_delay_time, it performs the legacy retransmission scheme (that is, 802.11 standard retransmission) until the transmission succeeds. If the data frame is lost, loss_count=1, and the process returns to S45-2.

At S49, when the count value of the retransmission counter of the first AP device reaches first_retry_threshold, the first AP device calculates the transmission success rate of the second AP device according to sec_count and sec_suc_count, and compares it with transfer_threshold. If the transmission success rate of the second AP device is not smaller than transfer_threshold, then the process proceeds with S49-1, or otherwise the process proceeds with S49-2.

Specifically, transfer_threshold=1−(sec_suc_count+loss_count)/(i−1).

At S49-1, the first AP device reports the special data message used by the first AP device to request identity switching to the AC device to the special message entity. The first AP device resets the values in the retransmission determination function entity, exchanges the identity labels of the first AP device and the second AP device in the operation set record entity, and sets the identity label as second. The AC device forwards the special data message for requesting identity switching via the interactive information processing entity, the second AP device processes the special data message for requesting identity switching, the second AP device exchanges the identity labels of the first AP device and the second AP device in the operation set record entity, sets the identity as first, and continues the transmission, and the process returns to S45-2.

At S49-2, the transmission effect of the second AP device is not better than that of the first AP device, and the process returns to S45 after performing legacy retransmission (i.e. 802.11 standard retransmission).

It should be noted that the retransmission counter (retry_count) in Embodiment 1 may be the above first counter, the second AP device transmission counter (sec_count) in Embodiment 1 may be the above second counter, the second AP device transmission success counter (sec_suc_count) in Embodiment 1 may be the above third counter, the data frame loss counter (loss_count) in Embodiment 1 may be the above fourth counter, and the first AP device consecutive transmission success counter (con_suc_count) in Embodiment 1 may be the above fifth counter. In addition, the first AP retransmission threshold in Embodiment 1 may be the above first threshold, the first AP device identity switching threshold (transfer_threshold) in Embodiment 1 may be the above second threshold, and the consecutive successful transmission threshold (con_suc_threshold) in Embodiment 1 may be the above predetermined value.

In Embodiment 2, the station device is a legacy device, the data frame transmission may be as shown in FIG. 17, and the specific data frame transmission process may be as described in S51-S59.

At S51, in the AC+FIT AP architecture, the AC device determines the neighboring AP devices of each AP device according to the topology of multiple AP devices, and constructs a candidate set for each AP device (itself and all neighboring AP devices (neighboring APs are slave APs)), and stores it in the multi-AP candidate set and operation set management entity in the AC device in the form of a two-dimensional array. The AC device updates and maintains the candidate set. If a new AP device goes online, the AC device defines a candidate set for it according to its location, and updates the candidate set to store a two-dimensional array. If an AP device goes offline, the AC device should maintain the candidate set corresponding to the AP device, such that the candidate set does not need to be defined when the AP device goes online again.

At S52, the legacy device performs the legacy access process, including scanning, link authentication, and association. Its device information is stored in a legacy device management entity in the AC device.

At S53, after the first AP device obtains the TXOP, it first determines whether a cooperation set needs to be established. If the CSI between the first AP device and the legacy device is smaller than CSI_threshold, it indicates that cooperative transmission is required.

Further, the first AP device reports a special message requesting to establish an operation set to the special message entity, and the AC device informs the slave APs in the candidate set corresponding to the first AP device via the interactive information processing entity to perform explicit sounding, and obtains the CSI between the slave AP and the legacy device by using a serial sounding method, as shown in FIG. 9. The legacy device feeds back the CSI to the slave APs in the candidate set, and each slave AP decides whether to report a special message of CSI, load and data buffer information to the AC device by reporting to the special message entity according to its own load and data buffer condition. After the APs have reported, the AC device selects the second AP device according to a weighted combination of each AP's CSI, load condition, and data buffer condition, and informs the first AP device and the second AP device of the BSSID information of the selected second AP device and the BSSID information of the first AP device, respectively, via the interactive information processing entity. The first AP device stores the BSSID information of the first AP device and the BSSID information of the second AP device in its operation set record entity, determines the type of the station device according to the operation flow, and records it in the operation set record entity. The second AP device also stores the BSSID information of the first AP device and the BSSID information of the second AP device in its operation set record entity, determines the type of the station device according to the operation flow, and records it in the operation set record entity. That is, for the legacy device, the operation set is obtained by serial sounding.

At S54, the AC device distributes the data frame to the first AP device and the second AP device. The first AP device stores the data frame into the buffer for data of itself. The second AP device encapsulates the data according to the type of the station device in the operation set record entity, and stores it into the buffer for data of other APs. All data frames are numbered such that the buffers can be refreshed during subsequent transmissions. In the second AP device, for the legacy device, the sending address of the data frame is the BSSID of the first AP device.

It should be noted that the method for refreshing the buffer for data of other APs in the second AP device (the action of triggering refresh) includes:

Action 1: The AC device simultaneously distributes a new data frame to the first AP device and the second AP device. At this time, the second AP device receives the new data frame and refreshes the buffer for data of other APs in a queue (first in first out), to ensure that after refreshing, it is consistent with the content of the buffer for data of itself in the first AP device.

Action 2: When the first AP device fails to transmit, it requests the second AP device for retransmission via the AC device, and the second AP device refreshes the buffer for data of other APs of the second AP device according to the sequence number of the retransmitted data frame.

At S55, the first AP device initializes a retransmission counter (retry_count=0, with a lower limit of 0).

At S55-1, the first AP device initializes a counter in the retransmission determination function entity, and maintains a threshold parameter. The first AP device initializes: a second AP device transmission counter (sec_count=0), a second AP device transmission success counter (sec_suc_count=0), a first AP device consecutive transmission success counter (con_suc_count=0, with an upper limit of con_suc_threshold, which can be set to 3 to determine whether to decrement the retransmission counter by 1: in case of a number of consecutive successful transmissions, it means that the first AP device can continue transmission, and the count value of retry_count is decremented by 1), and a data frame loss counter (loss_count=0).

In addition, the first AP device maintains a first AP retransmission threshold (first_retry_threshold, for comparison with retry_count), maintains and updates a first AP device identity switching threshold (transfer_threshold), maintains a consecutive successful transmission threshold (con_suc_threshold), maintains a retransmission timer (ACK_time), and maintains a second AP device retransmission timer (retry_delay_time).

At S55-2, the first AP device transmits a data frame, the legacy device receives it successfully, and returns an ACK to the first AP device, and the consecutive transmission success counter con_suc_count is incremented by 1 (if con_suc_count reaches con_suc_threshold, then retry_count is decremented by 1), and then the first AP device transmits the next data frame (i=i+1); and step S55-2 is performed cyclically. If the first AP device does not receive the ACK after the ACK_time expires, it performs S56.

At S56, retry_count of the first AP device is incremented by 1, con_suc_count is set to 0, sec_count in the first AP device is incremented by 1, the count value of retry_count is compared with first_retry_threshold, and if it is smaller than first_retry_threshold (for example, if it is set to 2 or 3), then the process proceeds with S47, or otherwise the process proceeds with S49.

At S57, the retransmission counter retry_count is incremented by 1, the consecutive transmission success counter con_suc_count is set to 0, and sec_count is incremented by 1. The first AP device compares the count value of the retransmission counter with first_retry_threshold. If the count value of the retransmission counter is smaller than first_retry_threshold, the process proceeds with S57-1, or otherwise the process proceeds with S59.

At S57-1, the first AP device requests the second AP device to retransmit the data frame that the first AP device fails to transmit by reporting to the special message entity, and sets the second AP device retransmission timer (retry_delay_time). The AC device forwards the request via the interactive information processing entity. If the first AP device receives an ACK returned from the legacy device within the retry_delay_time, it means that the second AP device retransmits successfully. The process of the successful retransmission is shown in FIG. 12, and the specific process is as follows. Otherwise, the process proceeds with S58.

The second AP device processes the retransmission request message from the first AP device, and starts to retransmit the i-th data frame. After successfully receiving the data frame, the legacy device returns an ACK to the first AP device. After receiving the ACK, the first AP device refreshes the buffer for data of itself, and increments sec_suc_count by 1, i=i+1. At the same time, it transmits to the second AP device a message indicating that the second AP device retransmits successfully via the AC device. The second AP device processes related message and refreshes the buffer for data of other APs. The process returns to S55-2.

At S58, if the first AP device does not receive the ACK from the legacy device within retry_delay_time, it performs the legacy retransmission scheme (that is, 802.11 standard retransmission) until the transmission succeeds. If the data frame is lost, loss_count=1, and the process returns to S55-2.

At S59, when the count value of the retransmission counter of the first AP device reaches first_retry_threshold, the first AP device calculates the transmission success rate of the second AP device according to sec_count and sec_suc_count, and compares it with transfer_threshold. If the transmission success rate of the second AP device is not smaller than transfer_threshold, then the process proceeds with S59-1, or otherwise the process proceeds with S59-2.

Specifically, transfer_threshold=1−(sec_suc_count+loss_count)/(i−1).

At S59-1, the first AP device reports to the AC device the special data message used by the first AP device to request for switching the access point device associated with the legacy device from the first AP device to the first AP device by reporting to the special message entity. The first AP device resets the values in the retransmission determination function entity. The AC device forwards the special data message for requesting to switch the access point device associated with the legacy device from the first AP device to the first AP device via the interactive information processing entity, and the second AP device processes the special data message for requesting to switch the access point device associated with the legacy device from the first AP device to the first AP device, and the second AP device performs the switching, that is, the legacy device re-associates with the second AP device, and continues transmission. The process returns to S55-2.

At S59-2, the transmission effect of the second AP device is not better than that of the first AP device, and the process returns to S55 after performing legacy retransmission (i.e. 802.11 standard retransmission).

It should be noted that the retransmission counter (retry_count) in Embodiment 2 may be the above first counter, the second AP device transmission counter (sec_count) in Embodiment 2 may be the above second counter, the second AP device transmission success counter (sec_suc_count) in Embodiment 2 may be the above third counter, the data frame loss counter (loss_count) in Embodiment 2 may be the above fourth counter, and the first AP device consecutive transmission success counter (con_suc_count) in Embodiment 2 may be the above fifth counter. In addition, the first AP retransmission threshold in Embodiment 2 may be the above first threshold, the first AP device identity switching threshold (transfer_threshold) in Embodiment 2 may be the above second threshold, and the consecutive successful transmission threshold (con_suc_threshold) in Embodiment 2 may be the above predetermined value.

The method embodiments of the present disclosure have been described in detail above in conjunction with FIG. 2 to FIG. 17, and the apparatus embodiments of the present disclosure will be described in detail below in conjunction with FIG. 18 to FIG. 22. It should be understood that the apparatus embodiments and the method embodiments correspond to each other, and for similar description, reference can be made to the method embodiments.

FIG. 18 shows a schematic block diagram of an access point device 300 according to an embodiment of the present disclosure. As shown in FIG. 18, the access point device 300 is a first access point device, and the access point device 300 includes:

a communication unit 310 configured to transmit first request information when the first access point device fails to transmit a first data frame to a station device, the first request information requesting a second access point device to retransmit the first data frame, and the first access point device and the second access point device belonging to one operation set.

Optionally, the first access point device may include a first data buffer and a second data buffer, the first data buffer being configured to buffer data of the first access point device itself, and the second data buffer being configured to buffer data of other access point devices.

The second access point device may include a third data buffer and a fourth data buffer, the third data buffer being configured to buffer data of the second access point device itself, and the fourth data buffer being configured to buffer data of other access point devices.

Here, the first data frame is buffered in both the first data buffer and the fourth data buffer.

Optionally, content buffered in the first data buffer may be same as content buffered in the fourth data buffer.

Optionally, the first data buffer may be refreshed when the first access point device receives a new data frame; and/or the fourth data buffer may be refreshed when an access control device simultaneously distributes a data frame to the first access point device and the second access point device, or the fourth data buffer may be refreshed when the first access point device requests the second access point device to retransmit a data frame.

Optionally, the communication unit 310 may be further configured to receive first response information transmitted by the second access point device, the first response information instructing the first access point device to continue transmitting data frames; and the communication unit 310 may be further configured to transmit a second data frame to the station device.

Optionally, the access point device 300 may further includes:

a processing unit 320 configured to determine, when a count value of a first counter reaches a first threshold, whether to exchange identity information of the first access point device and the second access point device in the operation set.

The first counter is configured to record a number of retransmissions by the second access point device, and the count value of the first counter is decremented by 1 when a number of consecutive successful transmissions by the first access point device reaches a predetermined value.

In the operation set, an identity of the first access point is initial transmission of data frame, and an identity of the second access point is retransmission of data frame.

Optionally, the processing unit 320 may be configured to:

determine to exchange the identity information of the first access point device and the second access point device in the operation set when a transmission success rate of the second access point device is greater than a second threshold; and determine not to exchange the identity information of the first access point device and the second access point device in the operation set when the transmission success rate of the second access point device is smaller than or equal to the second threshold.

Optionally, the communication unit 310 may be further configured to transmit when the first access point device determines to exchange the identity information of the first access point device and the second access point device in the operation set, a second request information, the second request information requesting to exchange the identity information of the first access point device and the second access point device in the operation set.

Optionally, a sending address for the second access point device to retransmit the first data frame may be a Basic Service Set Identifier (BSSID) of the second access point device.

Optionally, the operation set may be obtained by parallel sounding.

Optionally, the communication unit 310 may be further configured to receive second response information transmitted by the station device, the second response information indicating that the station device has successfully received the first data frame; and the communication unit 310 may be further configured to transmit a second data frame to the station device.

Optionally, the communication unit 310 may be further configured to transmit first indication information, the first indication information instructing the second access point device to refresh a buffer configured to buffer data of other access point devices.

Optionally, the access point device 300 may further include:

a processing unit 320 configured to determine, when a count value of a first counter reaches a first threshold, whether an access point device associated with the station device is switched from the first access point device to the second access point device.

The first counter is configured to record a number of retransmissions by the second access point device, and the count value of the first counter is decremented by 1 when a number of consecutive successful transmissions by the first access point device reaches a predetermined value.

Optionally, the processing unit 320 may be configured to:

determine that the access point device associated with the station device is switched from the first access point device to the second access point device when a transmission success rate of the second access point device is greater than a second threshold, or determine that the access point device associated with the station device is not switched from the first access point device to the second access point device when the transmission success rate of the second access point device is smaller than or equal to the second threshold.

Optionally, the communication unit 310 may be further configured to transmit, when the first access point device determines that the access point device associated with the station device is switched from the first access point device to the second access point device, third request information, the third request information requesting to switch the access point device associated with the station device from the first access point device to the second access point device.

Optionally, a sending address for the second access point device to retransmit the first data frame may be a BSSID of the first access point device.

Optionally, the operation set may be obtained by serial sounding.

Optionally, the transmission success rate of the second access point device may be determined according to a count value of a second counter and a count value of a third counter, and the second counter may be configured to record a number of transmissions by the second access point device, and the third counter may be configured to record a number of successful transmissions by the second access point device.

Optionally, the second threshold may be determined according to a count value of a third counter and a count value of a fourth counter, and the third counter may be configured to record a number of successful transmissions by the second access point device, and the fourth counter is configured to record a number of times data frames are lost.

Optionally, the second threshold may be calculated by:

$$\text{the second threshold}=1-(C_1+C_2)/(i-1),$$

where $C_1$ is the count value of the third counter, $C_2$ is the count value of the fourth counter, i is an identifier of a current data frame or i is a difference between the identifier of the current data frame and an identifier of the data frame before identity exchange or i is a difference between the identifier of the current data frame and the identifier of the data frame before the access point device switching.

Optionally, the access point device 300 may further include:

a processing unit 320 configured to maintain and/or update at least one of:

a first counter configured to record a number of retransmissions by the second access point device, a count value of the first counter being decremented by 1 when a number of consecutive successful transmissions by the first access point device reaches a predetermined value;

a second counter configured to record a number of transmissions by the second access point device;

a third counter configured to record a number of successful transmissions by the second access point device;

a fourth counter configured to record a number of times data frames are lost; or a fifth counter configured to record a number of consecutive successful transmissions by the first access point device.

Optionally, in some embodiments, the above communication unit may be a communication interface or a transceiver, or an input/output interface of a communication chip or a system-on-chip. The above processing unit may be one or more processors.

It should be understood that the access point device 300 according to the embodiment of the present disclosure may correspond to the first access point device in the method embodiment of the present disclosure, and the above and other operations and/or functions of the respective units in the access point device 300 are provided for the purpose of implementing the process flow corresponding to the first access point device in the method 200 shown in FIG. 2, and details thereof will be not omitted here for brevity.

FIG. 19 shows a schematic block diagram of an access point device 400 according to an embodiment of the present disclosure. As shown in FIG. 19, the access point device 19 is a second access point device, and the access point device 400 includes:

a communication unit 410 configured to:

receive, when a first access point device fails to transmit a first data frame to a station device, first request information, the first request information requesting a second access point device to retransmit the first data frame, and the first access point device and the second access point device belonging to one operation set; and retransmit the first data frame to the station device in response to the first request information.

Optionally, the first access point device may include a first data buffer and a second data buffer, the first data buffer being configured to buffer data of the first access point device itself, and the second data buffer being configured to buffer data of other access point devices.

The second access point device may include a third data buffer and a fourth data buffer, the third data buffer being configured to buffer data of the second access point device itself, and the fourth data buffer being configured to buffer data of other access point devices.

The first data frame is buffered in both the first data buffer and the fourth data buffer.

Optionally, content buffered in the first data buffer may be same as content buffered in the fourth data buffer.

Optionally, the first data buffer may be refreshed when the first access point device receives a new data frame; and/or the fourth data buffer may be refreshed when an access control device simultaneously distributes a data frame to the first access point device and the second access point device, or the fourth data buffer may be refreshed when the first access point device requests the second access point device to retransmit a data frame.

Optionally, the communication unit 410 may be further configured to transmit, when the retransmission of the first data frame succeeds, first response information, the first response information instructing the first access point device to continue transmitting data frames.

Optionally, the access point device 400 may further include:

a processing unit 420 configured to refresh a buffer configured to buffer data of other access point devices.

Optionally, the access point device 400 may further include:

a processing unit 420, where the communication unit 410 may be further configured to receive, when the first access point device determines to exchange identity information of the first access point device and the second access point device in the operation set, second request information, the second request information requesting to exchange the identity information of the first access point device and the second access point device in the operation set, where in the operation set, an identity of the first access point is initial transmission of data frame, and an identity of the second access point is retransmission of data frame; and the processing unit 420 may be configured to exchange the identity information of the first access point device and the second access point device in the operation set in response to the second request information.

Optionally, a sending address for the second access point device to retransmit the first data frame may be a Basic Service Set Identifier (BSSID) of the second access point device.

Optionally, the operation set may be obtained by parallel sounding.

Optionally, the access point device 400 may further include:

a processing unit 420, where the communication unit 410 may be further configured to receive, when the retransmission of the first data frame succeeds, first indication information, the first indication information instructing the second access point device to refresh a buffer configured to buffer data of other access point devices; and the processing unit 420 may be configured to refresh the buffer configured to buffer data of other access point devices according to the first indication information.

Optionally, the communication unit 410 may be further configured to receive, when the first access point device determines that an access point device associated with the station device is switched from the first access point device to the second access point device, third request information, the third request information requesting to switch the access point device associated with the station device from the first access point device to the second access point device; and the processing unit 420 may be configured to associate with the station device in response to the third request information.

Optionally, a sending address for the second access point device to retransmit the first data frame may be a BSSID of the first access point device.

Optionally, the operation set may be obtained by serial sounding.

Optionally, in some embodiments, the above communication unit may be a communication interface or a transceiver, or an input/output interface of a communication chip or a system-on-chip. The above processing unit may be one or more processors.

It should be understood that the access point device 400 according to the embodiment of the present disclosure may correspond to the second access point device in the method embodiment of the present disclosure, and the above and other operations and/or functions of the respective units in the access point device 400 are provided for the purpose of implementing the process flow corresponding to the second access point device in the method 200 shown in FIG. 2, and details thereof will be not omitted here for brevity.

FIG. 20 is a schematic diagram showing a structure of a communication device 500 according to an embodiment of the present disclosure. The communication device 500 shown in FIG. 20 includes a processor 510, and the processor 510 can invoke and execute a computer program from a memory to implement the method in the embodiment of the present disclosure.

Optionally, as shown in FIG. 20, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, as shown in FIG. 20, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 530 may further include one or more antennas.

Optionally, the communication device 500 may specifically be the first access point device according to the embodiment of the present disclosure, and the communication device 500 may implement the corresponding processes implemented by the first access point device in any of the methods according to the embodiments of the present disclosure. For the sake of brevity, details thereof will be omitted here.

Optionally, the communication device 500 may specifically be the second access point device according to the embodiment of the present disclosure, and the communication device 500 may implement the corresponding processes implemented by the second access point device in any of the methods according to the embodiments of the present disclosure. For the sake of brevity, details thereof will be omitted here.

FIG. 21 is a schematic diagram showing a structure of an apparatus according to an embodiment of the present disclosure. The apparatus 600 shown in FIG. 21 includes a processor 610, and the processor 610 can invoke and execute a computer program from a memory to implement the method in the embodiment of the present disclosure.

Optionally, as shown in FIG. 21, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the first access point device in the embodiment of the present disclosure, and the apparatus can implement the corresponding processes implemented by the first access point device in the various methods of the embodiments of the present disclosure. For the sake of brevity, details thereof will be omitted here.

Optionally, the apparatus can be applied to the second access point device in the embodiment of the present disclosure, and the apparatus can implement the corresponding processes implemented by the second access point device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

FIG. 22 is a schematic block diagram showing a communication system 700 according to an embodiment of the present disclosure. As shown in FIG. 22, the communication system 700 includes a first access point device 710, a second access point device 720, an access control device 730, and a station device 740.

Here, the first access point device 710 can be configured to implement the corresponding functions implemented by the first access point device in the above method, and the second access point device 720 can be configured to implement the corresponding functions implemented by the second access point device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external buffer. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the first access point device in the embodiment of the present disclosure, and the computer program can cause a computer to perform corresponding procedures implemented by the first access point device in the method according to any of the embodiments of the present disclosure. Details thereof will be omitted here for simplicity.

Optionally, the computer readable storage medium can be applied to the second access point device in the embodiment of the present disclosure, and the computer program can cause a computer to perform corresponding procedures implemented by the second access point device in the method according to any of the embodiments of the present disclosure. Details thereof will be omitted here for simplicity.

An embodiment of the present disclosure also provides a computer program product including computer program instructions.

Optionally, the computer program product can be applied to the first access point device in the embodiment of the present disclosure, and the computer program instructions can cause a computer to perform corresponding procedures implemented by the first access point device in the method according to any of the embodiments of the present disclosure. Details thereof will be omitted here for simplicity.

Optionally, the computer program product can be applied to the second access point device in the embodiment of the present disclosure, and the computer program instructions can cause a computer to perform corresponding procedures implemented by the second access point device in the method according to any of the embodiments of the present disclosure. Details thereof will be omitted here for simplicity.

An embodiment of the present disclosure also provides a computer program.

Optionally, the computer program can be applied to the first access point device in the embodiment of the present disclosure. The computer program, when executed on a computer, can cause the computer to perform corresponding procedures implemented by the first access point device in the method according to any of the embodiments of the present disclosure. Details thereof will be omitted here for simplicity.

Optionally, the computer program can be applied to the second access point device in the embodiment of the present disclosure. The computer program, when executed on a computer, can cause the computer to perform corresponding procedures implemented by the second access point device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A data retransmission method, applied to a wireless fidelity system, comprising:

transmitting, by a first access point device, first request information to a second access point device based on the first access point device failing to transmit a first data frame to a station device, the first request information requesting the second access point device to retransmit the first data frame, and the first access point device and the second access point device belonging to one operation set, wherein the operation set comprises access point devices participating in cooperation transmission with the first access point device, wherein the second access point device is used to retransmit the first data frame to the station device in response to the first request information;

receiving, by the first access point device, first response information transmitted by the second access point device, the first response information instructing the first access point device to continue transmitting data frames:

transmitting, by the first access point device, a second data frame to the station device; and determining, by the first access point device based on a count value of a first counter reaching a first threshold, whether to exchange identity information of the first access point device and the second access point device in the operation set;

wherein the first counter is configured to record a number of retransmissions by the second access point device, and the count value of the first counter is decremented by 1 based on a number of consecutive successful transmissions by the first access point device reaching a predetermined value; and wherein in the operation set, an identity of the first access point is initial transmission of data frame, and an identity of the second access point is retransmission of data frame.

2. The method according to claim 1, wherein, the first access point device comprises a first data buffer and a second data buffer, wherein the first data buffer is configured to buffer data of the first access point device itself, and the second data buffer is configured to buffer data of other access point devices;

the second access point device comprises a third data buffer and a fourth data buffer, wherein the third data buffer is configured to buffer data of the second access point device itself, and the fourth data buffer is configured to buffer data of other access point devices;

wherein the first data frame is buffered in both the first data buffer and the fourth data buffer.

3. The method according to claim 2, wherein, content buffered in the first data buffer is same as content buffered in the fourth data buffer.

4. The method according to in claim 2, wherein, the first data buffer is refreshed based on the first access point device receiving a new data frame; and/or the fourth data buffer is refreshed based on an access control device simultaneously distributing a data frame to the first access point device and the second access point device, or the fourth data buffer is refreshed based on the first access point device requesting the second access point device to retransmit a data frame.

5. The method according to claim 1, wherein said determining, by the first access point device, whether to exchange the identity information of the first access point device and the second access point device in the operation set comprises:

determining, by the first access point device, to exchange the identity information of the first access point device and the second access point device in the operation set based on a transmission success rate of the second access point device being greater than a second threshold; and determining, by the first access point device, not to exchange the identity information of the first access point device and the second access point device in the operation set based on the transmission success rate of the second access point device being smaller than or equal to the second threshold.

6. An access point device, serving as a first access point device, applied to a wireless fidelity system, the access point device comprising:

a processor, wherein the processor is configured to invoke and execute a computer program from a memory to perform:

transmitting first request information to a second access point device based on the first access point device failing to transmit a first data frame to a station device, the first request information requesting the second access point device to retransmit the first data frame, and the first access point device and the second access point device belonging to one operation set, wherein the operation set comprises access point devices participating in cooperation transmission with the first access point device, wherein the second access point device is used to retransmit the first data frame to the station device in response to the first request information;

receiving first response information transmitted by the second access point device, the first response information instructing the first access point device to continue transmitting data frames;

transmitting a second data frame to the station device; and determining, based on a count value of a first counter reaching a first threshold, whether to exchange identity information of the first access point device and the second access point device in the operation set;

wherein the first counter is configured to record a number of retransmissions by the second access point device, and the count value of the first counter is decremented by 1 based on a number of consecutive successful transmissions by the first access point device reaching a predetermined value; and wherein in the operation set, an identity of the first access point is initial transmission of data frame, and an identity of the second access point is retransmission of data frame.

7. The access point device according to claim 6, wherein the first access point device comprises a first data buffer and a second data buffer, wherein the first data buffer is configured to buffer data of the first access point device itself, and the second data buffer is configured to buffer data of other access point devices;

the second access point device comprises a third data buffer and a fourth data buffer, wherein the third data buffer is configured to buffer data of the second access point device itself, and the fourth data buffer is configured to buffer data of other access point devices;

wherein the first data frame is buffered in both the first data buffer and the fourth data buffer.

8. The access point device according to claim 7, wherein content buffered in the first data buffer is same as content buffered in the fourth data buffer.

9. The access point device according to claim 7, wherein the first data buffer is refreshed based on the first access point device receiving a new data frame; and/or the fourth data buffer is refreshed based on an access control device simultaneously distributing a data frame to the first access point device and the second access point device, or the fourth data buffer is refreshed based on the first access point device requesting the second access point device to retransmit a data frame.

10. The access point device according to claim 6, wherein the processor is configured to invoke and execute the computer program from the memory to further perform:

determining to exchange the identity information of the first access point device and the second access point device in the operation set based on a transmission success rate of the second access point device being greater than a second threshold; and determining not to exchange the identity information of the first access point device and the second access point device in the operation set based on the transmission success rate of the second access point device being smaller than or equal to the second threshold.

11. A non-transitory computer-readable storage medium, applied to a wireless fidelity system, wherein the non-transitory computer-readable storage medium stores a computer program that causes a computer to:

transmit first request information to a second access point device based on a first access point device failing to transmit a first data frame to a station device, the first request information requesting the second access point device to retransmit the first data frame, and the first access point device and the second access point device belonging to one operation set, wherein the operation set comprises access point devices participating in cooperation transmission with the first access point device, wherein the second access point device is used to retransmit the first data frame to the station device in response to the first request information;

receive first response information transmitted by the second access point device, the first response information instructing the first access point device to continue transmitting data frames;

transmit a second data frame to the station device; and determine, based on a count value of a first counter reaching a first threshold, whether to exchange identity information of the first access point device and the second access point device in the operation set;

wherein the first counter is configured to record a number of retransmissions by the second access point device, and the count value of the first counter is decremented by 1 based on a number of consecutive successful transmissions by the first access point device reaching a predetermined value; and wherein in the operation set, an identity of the first access point is initial transmission of data frame, and an identity of the second access point is retransmission of data frame.

\* \* \* \* \*